(12) United States Patent
Shishido

(10) Patent No.: US 9,367,443 B2
(45) Date of Patent: Jun. 14, 2016

(54) INFORMATION PROCESSING APPARATUS, INFORMATION PROCESSING SYSTEM, AND NON-TRANSITORY COMPUTER READABLE MEDIUM STORING INFORMATION PROCESSING PROGRAM

(71) Applicant: FUJI XEROX CO., LTD., Tokyo (JP)

(72) Inventor: Rie Shishido, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 646 days.

(21) Appl. No.: 13/644,885

(22) Filed: Oct. 4, 2012

(65) Prior Publication Data

US 2013/0219133 A1 Aug. 22, 2013

(30) Foreign Application Priority Data

Feb. 16, 2012 (JP) ................................ 2012-031788

(51) Int. Cl.
| | |
|---|---|
| *G06F 12/02* | (2006.01) |
| *G06F 11/00* | (2006.01) |
| *H04L 12/26* | (2006.01) |
| *H04L 29/08* | (2006.01) |
| *H04N 1/00* | (2006.01) |
| *H04L 29/14* | (2006.01) |

(52) U.S. Cl.
CPC ............ *G06F 12/0246* (2013.01); *G06F 11/00* (2013.01); *G06F 12/023* (2013.01); *H04L 43/0817* (2013.01); *H04L 43/103* (2013.01); *H04L 67/1097* (2013.01); *H04L 69/40* (2013.01); *H04N 1/00079* (2013.01); *H04N 1/00344* (2013.01); *H04N 1/00244* (2013.01); *H04N 2201/0081* (2013.01); *H04N 2201/0082* (2013.01); *H04N 2201/0091* (2013.01); *H04N 2201/0093* (2013.01); *H04N 2201/0094* (2013.01); *H04N 2201/214* (2013.01); *H04N 2201/3298* (2013.01)

(58) Field of Classification Search
CPC ............ G06F 12/0246; G06F 12/0866; G06F 3/0656; G06F 11/2094; G06F 2212/7205; G06F 13/1673; G06F 3/0679; G06F 2212/2022; G06F 2212/205; G06F 2212/7211; G06F 2212/7203

See application file for complete search history.

(56) References Cited

U.S. PATENT DOCUMENTS

| 5,832,358 | A | 11/1998 | Sampath et al. | |
|---|---|---|---|---|
| 2002/0063890 | A1 | 5/2002 | Hayashi et al. | |
| 2005/0050261 | A1* | 3/2005 | Roehr et al. | ................... 711/103 |

FOREIGN PATENT DOCUMENTS

| JP | A-11-147662 | 6/1999 |
|---|---|---|
| JP | A-2002-169427 | 6/2002 |

(Continued)

*Primary Examiner* — Reginald Bragdon
*Assistant Examiner* — Thanh Vo
(74) *Attorney, Agent, or Firm* — Oliff PLC

(57) ABSTRACT

An information processing apparatus includes a detecting unit that detects a capacity of a free space of a non-volatile storage device in an apparatus including the non-volatile storage device and a volatile storage device, a determining unit that determines whether the setting of notification destination information to the non-volatile storage device is available on the basis of the detected capacity, an information setting unit that sets the notification destination information to the volatile storage device when the determining unit determines that the setting of the notification destination information to the non-volatile storage device is not available, and an interval setting unit that sets an interval of communication for management with the apparatus to be shorter than that set when it is determined that the setting of the notification destination information is available, if the determining unit determines that the setting of the notification destination information is not available.

6 Claims, 10 Drawing Sheets

(56) References Cited

FOREIGN PATENT DOCUMENTS

| JP | A-2002-331728 | 11/2002 |
| JP | A-2003-30061 | 1/2003 |
| JP | A-2003-316668 | 11/2003 |
| JP | A-2010-56744 | 3/2010 |

* cited by examiner

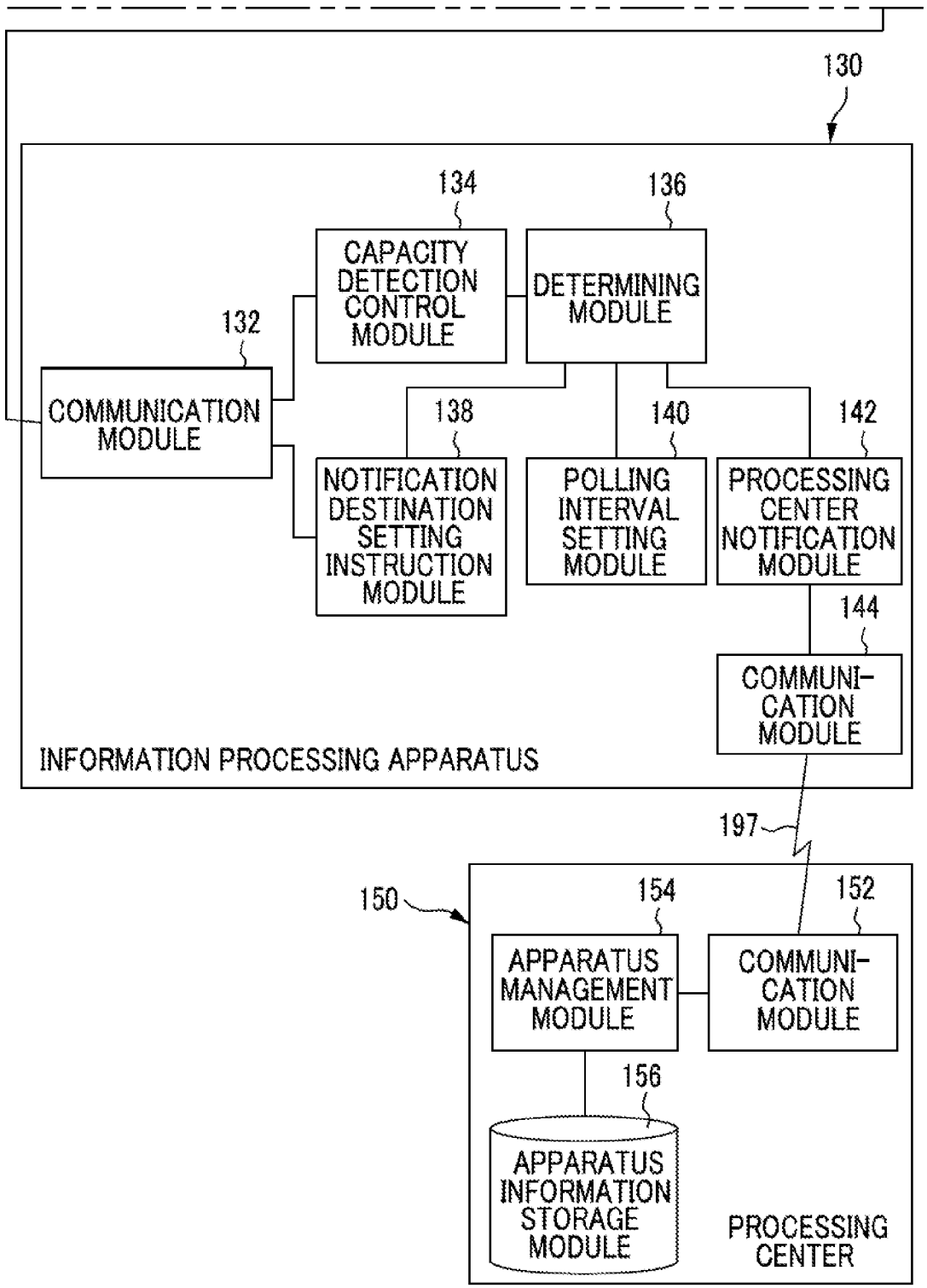

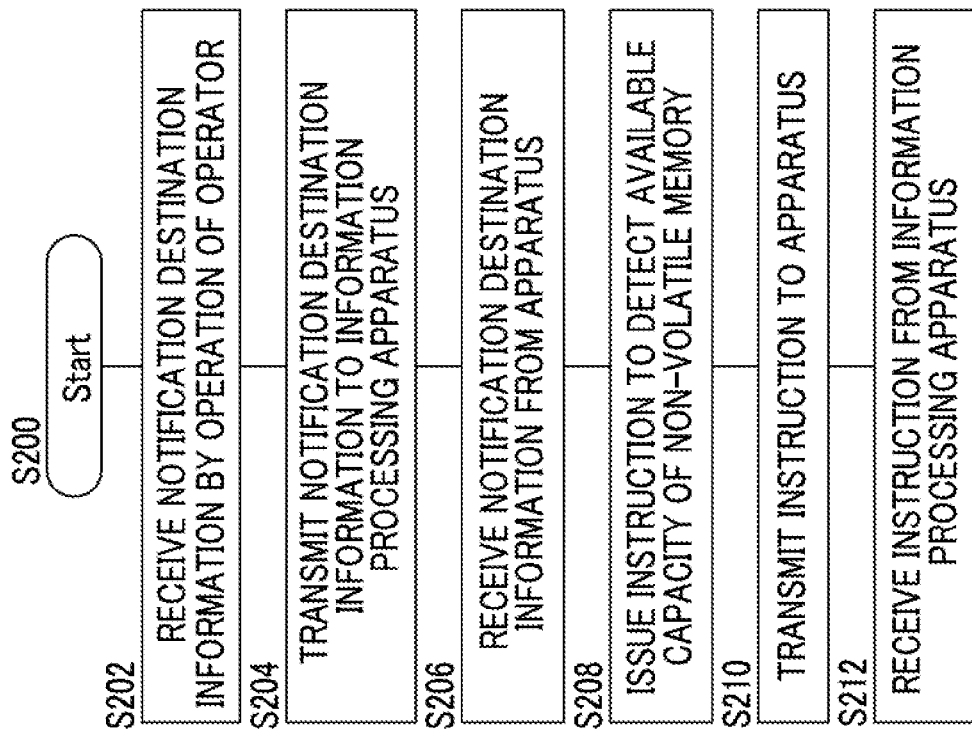

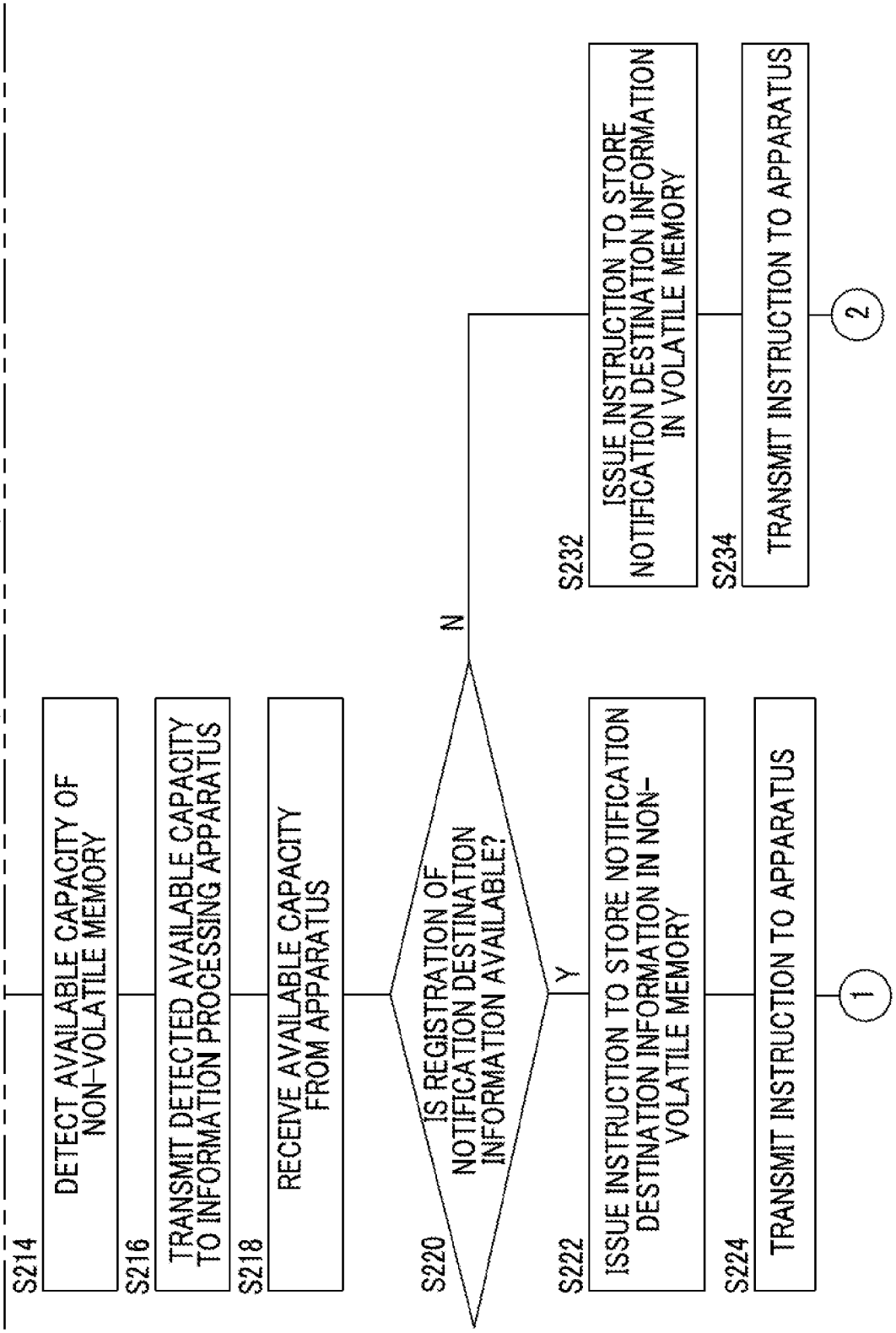

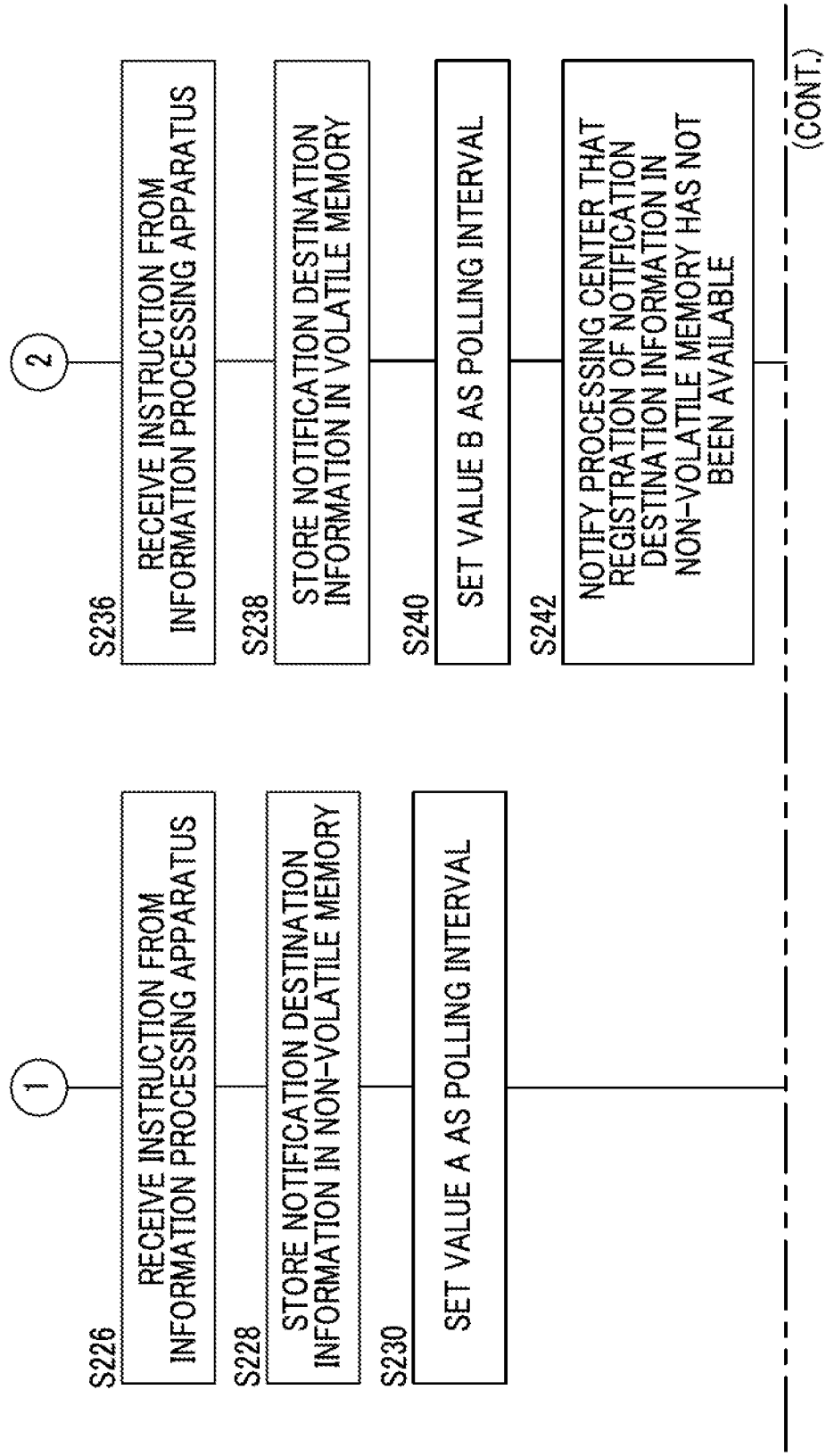

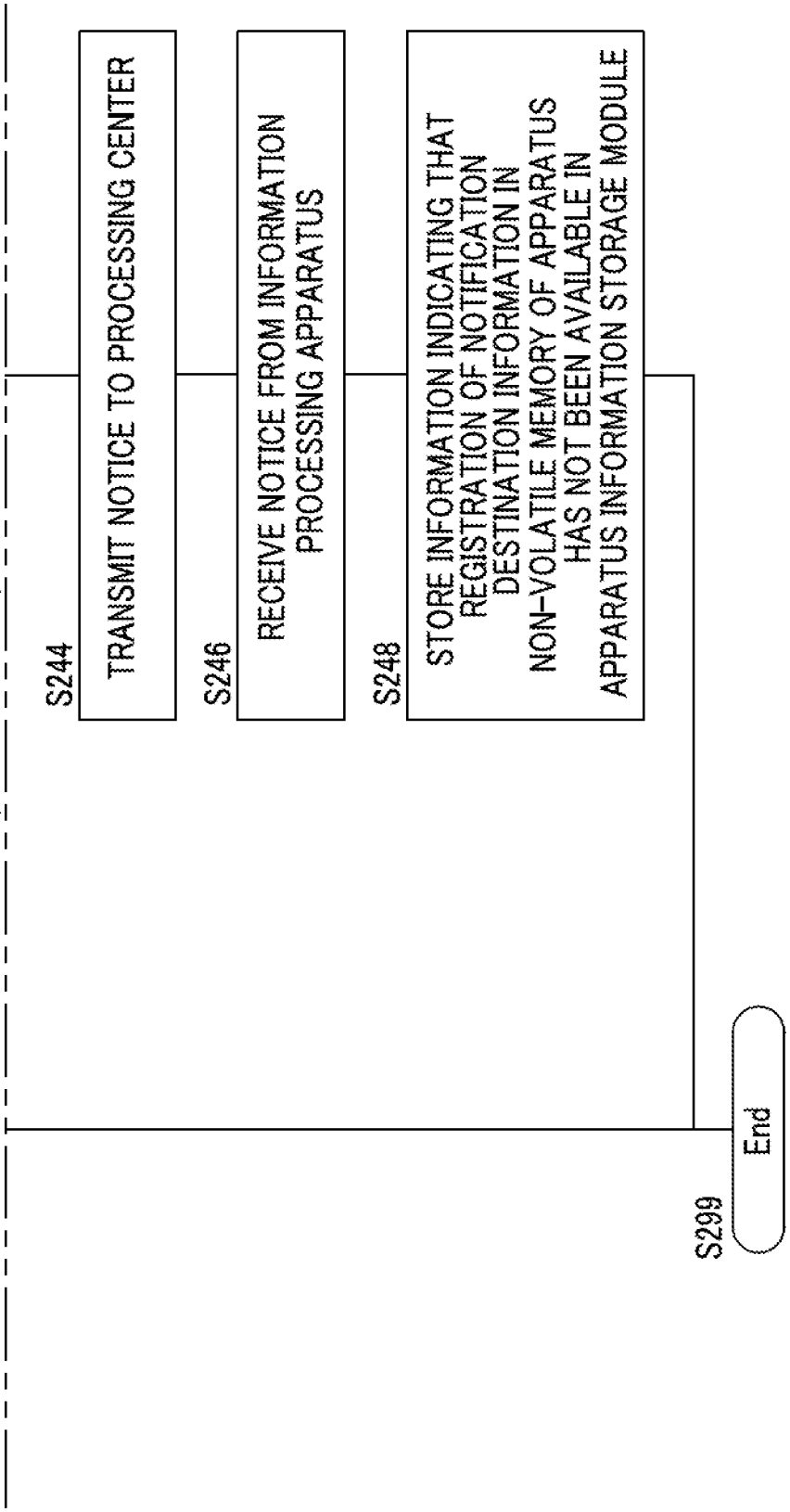

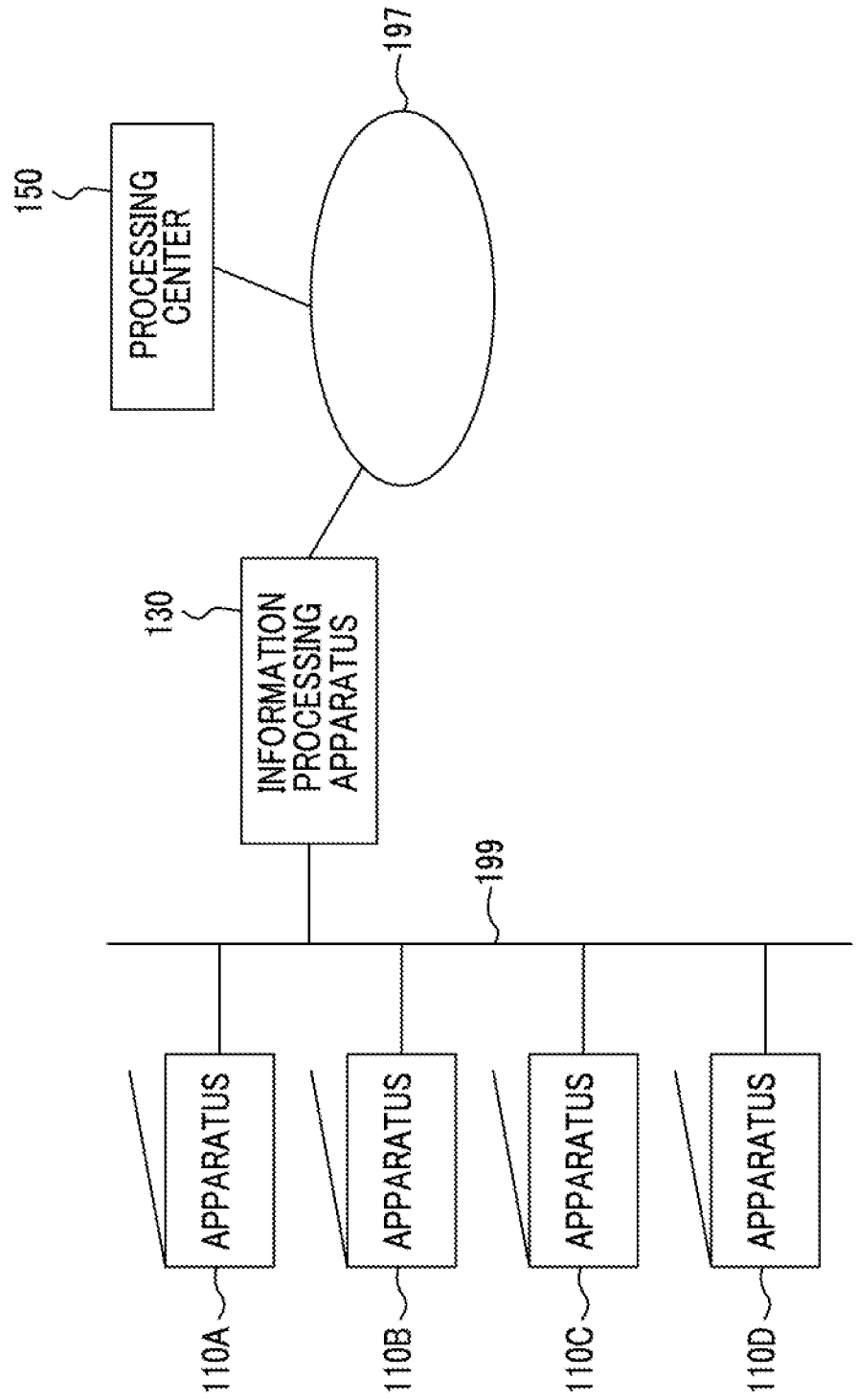

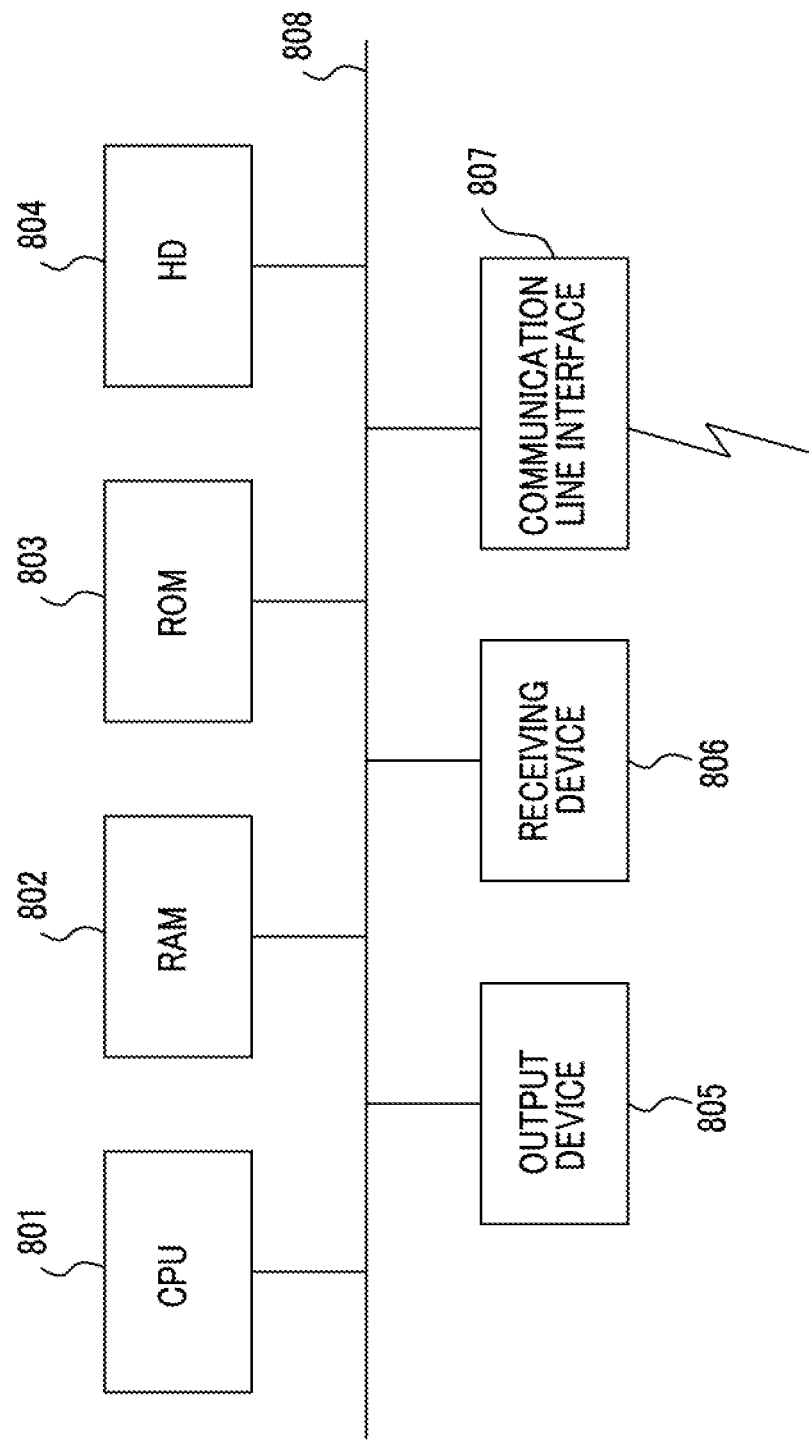

INFORMATION PROCESSING APPARATUS, INFORMATION PROCESSING SYSTEM, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2012-031788 filed Feb. 16, 2012.

BACKGROUND

Technical Field

The present invention relates to an information processing apparatus, an information processing system, and a non-transitory computer readable medium storing an information processing program.

SUMMARY

According to an aspect of the invention, there is provided an information processing apparatus including: a detecting unit that detects a capacity of a free space of a non-volatile storage device in an apparatus including the non-volatile storage device and a volatile storage device; a determining unit that determines whether the setting of notification destination information to the non-volatile storage device of the apparatus is available on the basis of the capacity detected by the detecting unit; an information setting unit that sets the notification destination information to the volatile storage device of the apparatus when the determining unit determines that the setting of the notification destination information to the non-volatile storage device is not available; and an interval setting unit that sets an interval of communication for management with the apparatus to be shorter than an interval which is set when it is determined that the setting of the notification destination information to the non-volatile storage device is available, if the determining unit determines that the setting of the notification destination information to the non-volatile storage device is not available.

BRIEF DESCRIPTION OF THE DRAWINGS

Exemplary embodiments of the present invention will be described in detail based on the following figures, wherein:

FIG. 2 is a flowchart illustrating an example of a process according to this exemplary embodiment;

FIG. 3 is a flowchart illustrating an example of the process according to this exemplary embodiment;

FIG. 4 is a diagram illustrating an example of the structure of a system according to this exemplary embodiment;

FIG. 8 is a block diagram illustrating an example of the hardware structure of a computer for implementing this exemplary embodiment.

DETAILED DESCRIPTION

Hereinafter, an exemplary embodiment of the invention will be described with reference to the accompanying drawings.

Figure 1:
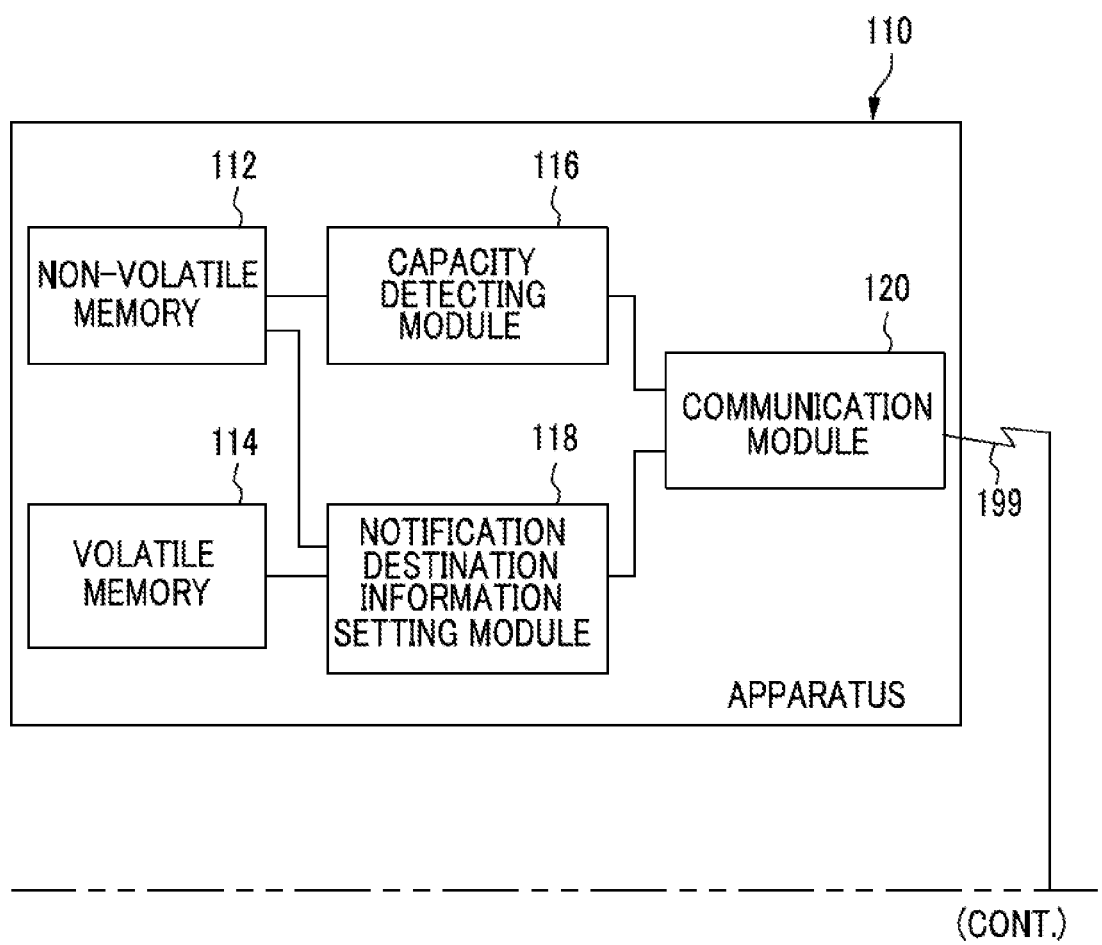
FIG. 1 is a conceptual module configuration diagram illustrating an example of a structure according to an exemplary embodiment.

FIG. 1 is a conceptual module configuration diagram illustrating an example of a structure according to this exemplary embodiment.

The term "module" refers generally to a component, such as logically separable software (computer program) and hardware. Therefore, a module in this exemplary embodiment indicates not only a module in a computer program, but also a module in a hardware structure. Thus, this exemplary embodiment relates to a computer program (including a program which causes a computer to perform each process, a program which causes a computer to function as each unit, and a program which causes a computer to implement the functions of each unit) that causes a computer to function as modules, a system, and a method. For convenience of description, as used herein, "store," "be stored", or the equivalents thereof mean that a computer program is stored in a storage device or is controlled such that it is stored in a storage device when the exemplary embodiment relates to the computer program. The module may be in one-to-one correspondence with a function. When modules are mounted, one module may be configured as one program, plural modules may be formed by one program, or one module may be formed by plural programs. Plural modules may be implemented by one computer, or one module may be implemented by plural computers in distributed or parallel environments. One module may include other modules. Hereinafter, the term "connection" includes physical connection and logical connection (for example, the transmission and reception of data, instructions, and the reference relationship between data). The term "predetermined" refers to being decided prior to a target process. The term "predetermined" includes not only determination before a process according to the exemplary embodiment starts, but also determination according to situations and conditions at that time or situations and conditions up to that time before a target process after the process according to the exemplary embodiment starts. When there are plural "predetermined values", the predetermined values may be different from each other or two or more values (of course, including all values) may be equal to each other. In addition, the sentence "when A is satisfied, B is performed" means that "if it is determined that A is satisfied, B is performed". However, a case in which it is not necessary to determine whether A is satisfied is excluded.

The term "system" or "apparatus" includes a structure including, for example, one computer, hardware, and a device and a structure in which, for example, plural computers, hardware, and devices are connected to each other by a communication unit, such as a network (including one-to-one correspondence communication connection). In the specification, "apparatus" is synonymous with "system." Of course, the "system" does not include anything that is merely a social "structure" (social system) that includes artificial decisions.

For each process by each module or each process when plural processes are performed in a module, target information is read from a storage device and is then processed and the process result is written to the storage device. Therefore, in some cases, the description of reading information from the storage device before the process and writing the process result to the storage device after the process is omitted. The storage device may include, for example, a hard disk, a Random Access Memory (RAM), an external storage medium, a storage device through a communication line, and a register in a Central Processing Unit (CPU).

An information processing system according to this exemplary embodiment manages an apparatus 110 and includes the apparatus 110, an information processing apparatus 130, and a processing center 150, as shown in FIG. 1.

The apparatus 110 includes a non-volatile memory 112, a volatile memory 114, a capacity detecting module 116, a notification destination information setting module 118, and a communication module 120. The apparatus 110 is managed by the processing center 150 and corresponds to, for example, an apparatus used in the office. Specifically, the apparatus 110 is, for example, a copier, a facsimile machine, a scanner, a printer, or a multi-function machine (for example, an image processing apparatus with two or more functions of a scanner, a printer, a copier, and a facsimile machine). Plural apparatuses 110 may be provided.

The non-volatile memory 112 is connected to the capacity detecting module 116 and the notification destination information setting module 118. The non-volatile memory 112 retains stored content as long as a deletion operation is not performed and even when no power is supplied and corresponds to, for example, an EPROM, an EEPROM (registered trademark), or a flash memory.

The volatile memory 114 is connected to the notification destination information setting module 118. The volatile memory 114 is configured such that stored content is deleted when the supply of power is cut and corresponds to, for example, a DRAM.

The capacity detecting module 116 is connected to the non-volatile memory 112 and the communication module 120. The capacity detecting module 116 detects a free space of the non-volatile memory 112. For example, the function of an Operating System (OS) of the apparatus 110 may be used to detect the free space of the non-volatile memory 112. In addition, the writing of data to the non-volatile memory 112 may be monitored to manage the memory used, thereby detecting the free space. The detection process may be performed by instructions from a capacity detection control module 134 of the information processing apparatus 130.

The notification destination information setting module 118 is connected to the non-volatile memory 112, the volatile memory 114, and the communication module 120. The notification destination information setting module 118 sets notification destination information to the non-volatile memory 112 or the volatile memory 114. In the setting process, the memory to which the notification destination information will be set is determined by instructions from a notification destination setting instruction module 138 of the information processing apparatus 130. The notification destination information corresponds to, for example, the addresses of the information processing apparatus 130 and the processing center 150 which are used to notify the processing center 150 of the content of trouble, such as a failure, when the trouble occurs in the apparatus 110. Specifically, the notification destination information is information about a notification destination in SNMP Trap. The term SNMP Trap is a situation notification report which is transmitted from a terminal (apparatus 110), which is a management target, to the management server (information processing apparatus 130) in network management using a Simple Network Management Protocol (SNMP). When a predetermined event occurs or the value reaches a threshold value in the apparatus 110 operated by an SNMP agent, SNMP Trap is transmitted to an SNMP manager. The notification destination information may include information other than the addresses of the information processing apparatus 130 and the processing center 150.

The communication module 120 is connected to the capacity detecting module 116 and the notification destination information setting module 118 and is also connected to a communication module 132 of the information processing apparatus 130 through the communication line 199. The communication module 120 has a function for communication between the apparatus 110 and the information processing apparatus 130. The communication line 199 may be a wireless line or a wired line and corresponds to, for example, a company internal LAN.

The information processing apparatus 130 includes the communication module 132, a capacity detection control module 134, a determining module 136, a notification destination setting instruction module 138, a polling interval setting module 140, a processing center notification module 142, and a communication module 144.

The communication module 132 is connected to the capacity detection control module 134 and the notification destination setting instruction module 138 and is also connected to the communication module 120 of the apparatus 110 through the communication line 199. The communication module 132 has a function for communication between the information processing apparatus 130 and the apparatus 110.

The capacity detection control module 134 is connected to the communication module 132 and the determining module 136. The capacity detection control module 134 detects the capacity of the free space of the non-volatile memory 112 from the apparatus 110. Specifically, the capacity detection control module 134 transmits an instruction to detect the capacity of the free space of the non-volatile memory 112 to the apparatus 110 and receives a response (the capacity of the free space of the non-volatile memory 112) to the instruction.

The determining module 136 is connected to the capacity detection control module 134, the notification destination setting instruction module 138, the polling interval setting module 140, and the processing center notification module 142. The determining module 136 determines whether the setting of the notification destination information to the non-volatile memory 112 of the apparatus 110 is available on the basis of the capacity detected by the capacity detection control module 134. Specifically, the determining module 136 compares the size of the free space of the non-volatile memory 112 with the size of the notification destination information. When the size of the free space is equal to or more than the size of the notification destination information, the determining module 136 determines that the setting of the notification destination information is available. In other cases, the determining module 136 determines that the setting of the notification destination information is not available.

The notification destination setting instruction module 138 is connected to the communication module 132 and the determining module 136. When the determining module 136 determines that the setting of the notification destination information to the non-volatile memory 112 of the apparatus 110 is not available, the notification destination setting instruction module 138 sets the notification destination information to the volatile memory 114 of the apparatus 110. Specifically, the notification destination setting instruction module 138 transmits an instruction to set the notification destination information to the volatile memory 114 to the apparatus 110. When the determining module 136 determines that the setting of the notification destination information to the non-volatile memory 112 of the apparatus 110 is available, the notification destination setting instruction module 138 sets the notification destination information to the non-volatile memory 112 of the apparatus 110. Specifically, the notification destination setting instruction module 138 transmits an instruction to set the notification destination information to the non-volatile memory 112 to the apparatus 110.

The polling interval setting module 140 is connected to the determining module 136. When the determining module 136 determines that the setting of the notification destination information to the non-volatile memory 112 of the apparatus 110 is not available, the polling interval setting module 140 sets the interval (hereinafter, referred to as a polling interval) of communication (communication for detecting the state of the apparatus 110 [for example, acquiring the failure of the apparatus 110]) for management with the apparatus to be shorter than that set when the determining module determines that the setting of the notification destination information to the non-volatile memory 112 of the apparatus 110 is available. The information processing apparatus 130 performs the polling communication with the apparatus 110 to detect the state of the apparatus 110. When the determining module 136 determines that the setting of the notification destination information to the non-volatile memory 112 of the apparatus 110 is available, the polling interval setting module 140 sets the interval of the communication for management with the apparatus 110 to be longer than that set when the determining module determines that the setting of the notification destination information to the volatile memory 114 of the apparatus 110 is available. That is, when the notification destination information is set to the non-volatile memory 112, the polling interval increases. When the notification destination information is set to the volatile memory 114, the polling interval is reduced. It is considered that the polling interval varies in both cases (the case in which the notification destination information is set to the non-volatile memory 112 and the case in which the notification destination information is set to the memory 114) for the following reason. When the notification destination information is set to the volatile memory 114, it is deleted only by turning off the apparatus 110, which makes it difficult for the apparatus 110 to notify the information processing apparatus 130 of its state (the state of the apparatus 110) which should be originally notified, as compared to the case in which the notification destination information is set to the non-volatile memory 112. That is, when the notification destination information is set to the volatile memory 114, it is difficult for the apparatus 110 to notify its state (the state of the apparatus 110) and the number of times the information processing apparatus 130 checks the state of the apparatus 110 increases, as compared to the case in which the notification destination information is set to the non-volatile memory 112.

After the polling interval is set, the information processing apparatus 130 performs the polling communication with the apparatus 110 to detect the state of the apparatus 110.

Figure 5:
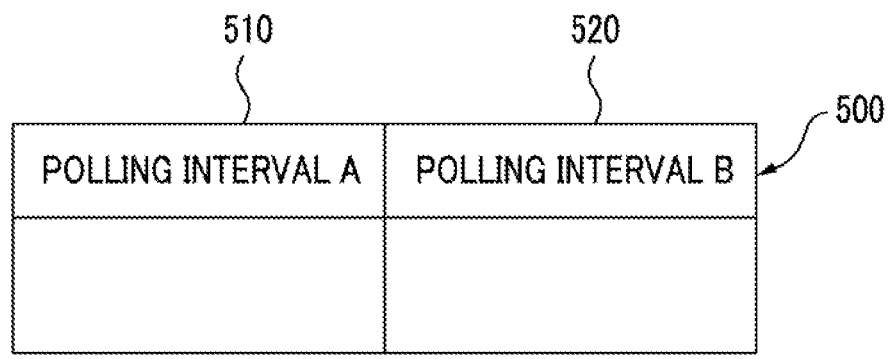
FIG. 5 is a diagram illustrating an example of the data structure of a polling interval table.

The polling interval set by the polling interval setting module 140 may be a predetermined value. For example, values stored in a polling interval table 500 may be used. FIG. 5 is a diagram illustrating an example of the data structure of the polling interval table 500. The polling interval table 500 includes a polling interval A field 510 and a polling interval B field 520. The polling interval A field 510 stores the polling interval when the notification destination information is set to the non-volatile memory 112. The polling interval stored in the polling interval A field 510 is longer than that stored in the polling interval B field 520. The polling interval B field 520 stores the polling interval when the notification destination information is set to the volatile memory 114. The polling interval stored in the polling interval B field 520 is shorter than that stored in the polling interval A field 510.

Figure 6:
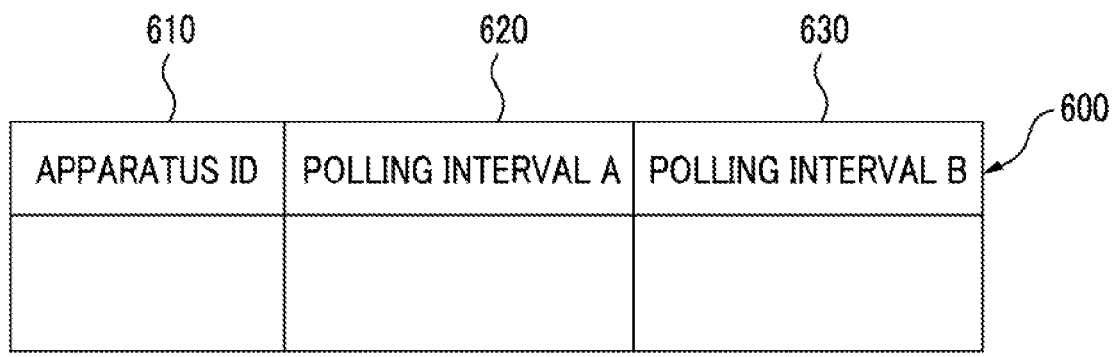
FIG. 6 is a diagram illustrating an example of the data structure of an apparatus and polling interval table.

In addition, values stored in an apparatus and polling interval table 600 may be used. FIG. 6 is a diagram illustrating an example of the data structure of the apparatus and polling interval table 600. The apparatus and polling interval table 600 includes an apparatus ID field 610, a polling interval A field 620, and a polling interval B field 630. The apparatus ID field 610 stores information (hereinafter, referred to as an apparatus ID) capable of uniquely identifying the apparatus 110 in this exemplary embodiment. The polling interval A field 620 is the same as the polling interval A field 510 of the polling interval table 500. The polling interval B field 630 is the same as the polling interval B field 520 of the polling interval table 500. In this way, it is possible to set different polling intervals for each apparatus. The frequency of occurrence of trouble varies depending on the apparatus and different polling intervals are set in order to correspond to the variation in the frequency of occurrence of trouble.

The processing center notification module 142 is connected to the determining module 136 and the communication module 144. When the determining module 136 determines that the setting of the notification destination information to the non-volatile memory 112 of the apparatus 110 is not available, the processing center notification module 142 notifies the processing center 150 managing the apparatus 110 that the setting of the notification destination information to the non-volatile memory 112 has not been available. The processing center 150 is an information processing apparatus indicated by the notification destination information.

The communication module 144 is connected to the processing center notification module 142 and is also connected to the communication module 152 of the processing center 150 through the communication line 197. The communication module 144 has a function for communication between the information processing apparatus 130 and the processing center 150. The communication line 197 may be a wireless line or a wired line and corresponds to, for example, a company internal LAN.

The processing center 150 includes a communication module 152, an apparatus management module 154, and an apparatus information storage module 156.

The communication module 152 is connected to the apparatus management module 154 and is also connected to the communication module 144 of the information processing apparatus 130 through the communication line 197. The communication module 152 has a function for communication between the processing center 150 and the information processing apparatus 130.

The apparatus management module 154 is connected to the communication module 152 and the apparatus information storage module 156. The apparatus management module 154 manages the apparatus 110. For example, the apparatus management module 154 manages the polling interval of the apparatus 110. When the polling interval of the apparatus 110 is short (when the notification destination information is set to the volatile memory 114), the apparatus management module 154 may detect that the apparatus 110 is turned off during polling communication. When the period for which power is turned off is equal to or more than a predetermined period, the apparatus management module 154 may notify the administrator of the apparatus 110 that the period for which power is turned off is equal to or more than the predetermined period.

Figure 7:
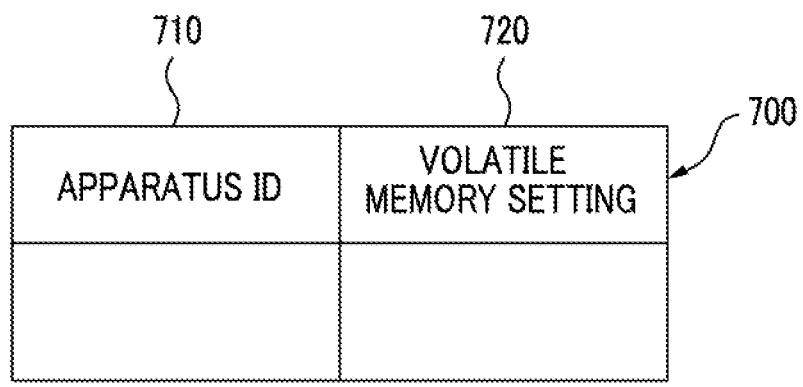
FIG. 7 is a diagram illustrating an example of the data structure of an apparatus and volatile memory setting table.

The apparatus information storage module 156 is connected to the apparatus management module 154. The apparatus information storage module 156 stores data managed by the apparatus management module 154. For example, the apparatus information storage module 156 stores the polling interval of the apparatus 110. For example, the apparatus information storage module 156 stores an apparatus and volatile memory setting table 700. FIG. 7 is a diagram illustrating an example of the data structure of the apparatus and volatile memory setting table 700. The apparatus and volatile memory setting table 700 includes an apparatus ID field 710 and a volatile memory setting field 720. The apparatus ID field 710 stores an apparatus ID. The volatile memory setting field 720 stores a flag indicating whether the notification destination information is set to the volatile memory 114.

FIGS. 2 and 3 are flowcharts illustrating an example of the process according to this exemplary embodiment.

In Step S202, the notification destination information setting module 118 of the apparatus 110 receives the notification destination information by the operation of the operator. For example, when the apparatus 110 is installed, the person in charge uses, for example, the keys and touch panel of the apparatus 110 to set the notification destination information for trouble occurring in the apparatus 110.

In Step S204, the communication module 120 of the apparatus 110 transmits the notification destination information to the information processing apparatus 130.

In Step S206, the communication module 132 of the information processing apparatus 130 receives the notification destination information from the apparatus 110.

In Step S208, the capacity detection control module 134 of the information processing apparatus 130 issues an instruction to detect the available capacity of the non-volatile memory 112.

In Step S210, the communication module 132 of the information processing apparatus 130 transmits the instruction to the apparatus 110.

In Step S212, the communication module 120 of the apparatus 110 receives the instruction from the information processing apparatus 130.

In Step S214, the capacity detecting module 116 of the apparatus 110 detects the available capacity of the non-volatile memory 112.

In Step S216, the communication module 120 of the apparatus 110 transmits the available capacity to the information processing apparatus 130.

In Step S218, the communication module 132 of the information processing apparatus 130 receives the available capacity from the apparatus 110.

In Step S220, the determining module 136 of the information processing apparatus 130 determines whether the registration of the notification destination information is available. When the registration of the notification destination information is available, the process proceeds to Step S222. In the other cases, the process proceeds to Step S232.

In Step S222, the notification destination setting instruction module 138 of the information processing apparatus 130 issues an instruction to store the notification destination information in the non-volatile memory 112.

In Step S224, the communication module 132 of the information processing apparatus 130 transmits the instruction to the apparatus 110.

In Step S226, the communication module 120 of the apparatus 110 receives the instruction from the information processing apparatus 130.

In Step S228, the notification destination information setting module 118 of the apparatus 110 stores the notification destination information in the non-volatile memory 112.

In Step S230, the polling interval setting module 140 of the information processing apparatus 130 sets a value A as the polling interval.

In Step S232, the notification destination setting instruction module 138 of the information processing apparatus 130 issues an instruction to store the notification destination information in the volatile memory 114.

In Step S234, the communication module 132 of the information processing apparatus 130 transmits the instruction to the apparatus 110.

In Step S236, the communication module 120 of the apparatus 110 receives the instruction from the information processing apparatus 130.

In Step S238, the notification destination information setting module 118 of the apparatus 110 stores the notification destination information in the volatile memory 114.

In Step S240, the polling interval setting module 140 of the information processing apparatus 130 sets a value B as the polling interval.

In Step S242, the processing center notification module 142 of the information processing apparatus 130 notifies the processing center 150 that the registration of the notification destination information in the non-volatile memory 112 has not been available.

In Step S244, the communication module 144 of the information processing apparatus 130 transmits the notice to the processing center 150.

In Step S246, the communication module 152 of the processing center 150 receives the notice from the information processing apparatus 130.

In Step S248, the apparatus management module 154 of the processing center 150 stores information indicating that the registration of the notification destination information in the non-volatile memory 112 of the apparatus 110 has not been available in the apparatus information storage module 156.

FIG. 4 is a diagram illustrating an example of the structure of the system according to this exemplary embodiment.

Each of the apparatus 110A, the apparatus 110B, the apparatus 110C, and the apparatus 110D is connected to the information processing apparatus 130 through the communication line 199. Four or more apparatuses 110 may be provided.

The information processing apparatus 130 is connected to the apparatus 110A, the apparatus 110B, the apparatus 100C, and the apparatus 110D through the communication line 199 and is also connected to the processing center 150 through the communication line 197.

The processing center 150 is connected to the information processing apparatus 130 through the communication line 197. In this example, one information processing apparatus 130 manages plural apparatuses 110. However, plural information processing apparatuses 130 may manage plural apparatuses 110.

The example of the process described in the flowcharts shown in FIGS. 2 and 3 is mainly performed when the information processing apparatus 130 performs a registration operation for the processing center 150 during the installation of the apparatus 110.

The information processing apparatus 130 and the processing center 150 remotely manage the apparatus 110. The apparatus 110, which is a management target, is loosely coupled to a monitoring apparatus (the information processing apparatus 130 and the processing center 150) (through the network). The term "management" is, for example, detecting a failure which occurs in the apparatus 110. The information processing apparatus 130, which is a monitoring terminal, periodically performs polling for the apparatus 110, detects the state of the apparatus 110, and notifies the processing center 150 of the state of the apparatus 110. For example, SNMP is used as the communication protocol.

FIG. 8 shows the hardware structure of a computer that executes a program according to this exemplary embodiment (the information processing apparatus 130 and the processing center 150). The computer is a general computer and is specifically a personal computer or a server. The apparatus 110 has the structure shown in FIG. 8 and also has unique structures (for example, a scanner and a printer). In the example shown in FIG. 8, a CPU 801 is used as a processing unit (arithmetic unit), and a RAM 802, a ROM 803, and an HD 804 are used as storage devices. For example, a hard disk may be used as the HD 804. The computer includes the CPU 801 that executes a program to implement the functions of, for example, the capacity detecting module 116, the notification destination information setting module 118, the capacity detection control module 134, the determining module 136, the notification destination setting instruction module 138, the polling interval setting module 140, the processing center notification module 142, and the apparatus management module 154, the RAM 802 that stores the program or data, the ROM 803 that stores, for example, a program for starting the computer, the HD 804, which is an auxiliary storage device, a receiving device 806 that receives data on the basis of the operation of the user for a keyboard, a mouse, or a touch panel, an output device 805, such as a CRT or a liquid crystal display, a communication line interface 807, such as a network interface card for connection to a communication network, and a bus 808 that connects the devices for data communication. Plural computers may be connected to each other by a network.

For a computer program in the above-described exemplary embodiment, the system with this hardware structure reads the computer program, which is software, and the above-described exemplary embodiment is implemented by cooperation between software and hardware resources.

The hardware structure shown in FIG. 8 is an illustrative example, but this exemplary embodiment is not limited to the hardware structure shown in FIG. 8. This exemplary embodiment may have any configuration as long as it may execute the modules described in this exemplary embodiment. For example, some modules may be configured as dedicated hardware components (for example, ASIC) and some modules may be provided in an external system and connected by a communication line. In addition, plural systems shown in FIG. 8 may be connected to each other by a communication line so as to cooperate with each other. In particular, the system may be incorporated into information appliances, copiers, facsimile machines, scanners, printers, and multi-function machines, in addition to the personal computer.

The above-mentioned program may be stored in a recording medium and then provided. In addition, the above-mentioned program may be provided by a communication unit. In this case, for example, the above-mentioned program may be understood as the invention of a "computer-readable recording medium having a program recorded thereon".

The "computer-readable recording medium having a program recorded thereon" refers to a computer-readable recording medium having a program recorded thereon which is used to, for example, install, execute, and distribute the program.

Examples of the recording medium may include digital versatile discs (DVDs), such as "DVD-R, DVD-RW, and DVD-RAM" which are the standards defined by the DVD Forum, and "DVD+R and DVD+RW" which are the standards defined by DVD+RW, compact discs (CDs), such as a read-only memory (CD-ROM), CD recordable (CD-R), and CD rewritable (CD-RW), a Blu-ray disc (registered trademark), a magneto-optical disc (MO), a flexible disk (FD), a magnetic tape, a hard disk, a read only memory (ROM), an electrically erasable programmable read-only memory (EEPROM (registered trademark)), a flash memory, a random access memory (RAM), and a Secure Digital (SD) memory card.

The program or a part thereof may be recorded and stored in the recording medium and then distributed. In addition, the program or a part thereof may be transmitted by communication using transmission media, such as wired networks including a local area network (LAN), a metropolitan area network (MAN), a wide area network (WAN), the Internet, an intranet, and an extranet, wireless communication networks, and combinations thereof. In addition, the program or a part thereof may be transmitted using carrier waves.

The program may be a part of another program, or it may be recorded on the recording medium along with a separate program. In addition, the program may be divided and recorded on plural recording media. In addition, the program may be recorded in any form including, for example, compression and encryption as long as it may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a detecting unit that detects a capacity of a free space of a non-volatile storage device in an apparatus separate from the information processing apparatus, the apparatus including the non-volatile storage device and a volatile storage device;
a determining unit that determines whether to store notification destination information in the non-volatile storage device of the apparatus based on the capacity of the free space of the non-volatile storage device detected by the detecting unit, the notification destination information indicating a destination outside the apparatus to notify of an error of the apparatus in response to an occurrence of the error;
an information setting unit to store the notification destination information to the volatile storage device of the apparatus when the determining unit determines that storing of the notification destination information to the non-volatile storage device is not possible;
an interval setting unit to store an interval of communication for management with the apparatus to be shorter than an interval which is set when it is determined that storing of the notification destination information to the non-volatile storage device is available, if the determining unit determines that the setting of the notification destination information to the non-volatile storage device is not possible; and
a communication unit that polls the apparatus at intervals according to the interval of communication set by the interval setting unit.

2. The information processing apparatus according to claim 1,
wherein, when the determining unit determines that storing of the notification destination information to the non-volatile storage device is possible, the information setting unit to store the notification destination information to the non-volatile storage device of the apparatus, and
when the determining unit determines that storing of the notification destination information to the non-volatile storage device is possible, the interval setting unit sets the interval of the communication for management with the apparatus to be longer than an interval which is set when it is determined that storing of the notification destination information to the volatile storage device is possible.

3. The information processing apparatus according to claim 1, further comprising:
a notifying unit that, when the determining unit determines that storing of the notification destination information to the non-volatile storage device is not possible, notifies another information processing apparatus which manages the apparatus that storing of the notification destination information to the non-volatile storage device is not possible.

4. The information processing apparatus according to claim 2, further comprising:
a notifying unit that, when the determining unit determines that storing of the notification destination information to the non-volatile storage device is not possible, notifies another information processing apparatus which manages the apparatus that storing of the notification destination information to the non-volatile storage device is not possible.

5. An information processing system comprising:
an apparatus including a non-volatile storage device and a volatile storage device;
a first information processing apparatus that is connected to the apparatus through a communication line; and
a second information processing apparatus that is connected to the first information processing apparatus through a communication line and manages the apparatus,
wherein the first information processing apparatus includes:
a detecting unit that detects a capacity of a free space of the non-volatile storage device in the apparatus separate from the first information processing apparatus,
a determining unit that determines whether to store notification destination information in the non-volatile storage device of the apparatus based on the capacity of the free space of the non-volatile storage device detected by the detecting unit, the notification destination information indicating a destination outside the apparatus to notify of an error of the apparatus in response to an occurrence of the error;
an information setting unit to store the notification destination information to the volatile storage device of the apparatus when the determining unit determines that storing of the notification destination information to the non-volatile storage device is not possible;
an interval setting unit that sets an interval of communication for management with the apparatus to be shorter than an interval which is set when it is determined that storing of the notification destination information to the non-volatile storage device is possible, if the determining unit determines that storing of the notification destination information to the non-volatile storage device is not possible;
a notifying unit that, when the determining unit determines that storing of the notification destination information to the non-volatile storage device is not possible, notifies another information processing apparatus which manages the apparatus that storing of the notification destination information to the non-volatile storage device is not possible; and
a communication unit that polls the apparatus at intervals according to the interval of communication set by the interval setting unit.

6. A non-transitory computer readable medium storing an information processing program that causes a computer in an information processing apparatus to function as:
a detecting unit that detects a capacity of a free space of a non-volatile storage device in an apparatus separate from the information processing apparatus, the apparatus including the non-volatile storage device and a volatile storage device;
a determining unit that determines whether to store notification destination information in the non-volatile storage device of the apparatus based on the capacity of the free space of the non-volatile storage device detected by the detecting unit, the notification destination information indicating a destination outside the apparatus to notify of an error of the apparatus in response to an occurrence of the error;
an information setting unit to store the notification destination information to the volatile storage device of the apparatus when the determining unit determines that storing of the notification destination information to the non-volatile storage device is not possible;
an interval setting unit to store an interval of communication for management with the apparatus to be shorter than an interval which is set when it is determined that storing of the notification destination information to the non-volatile storage device is possible, if the determining unit determines that storing of the notification destination information to the non-volatile storage device is not possible; and
a communication unit that polls the apparatus at intervals according to the interval of communication set by the interval setting unit.

* * * * *